Jan. 14, 1969   J. LOGRIPPO   3,421,405
BRAIDED RUG EMPLOYING THERMOPLASTIC TUBING
Filed Oct. 14, 1964   Sheet 2 of 2

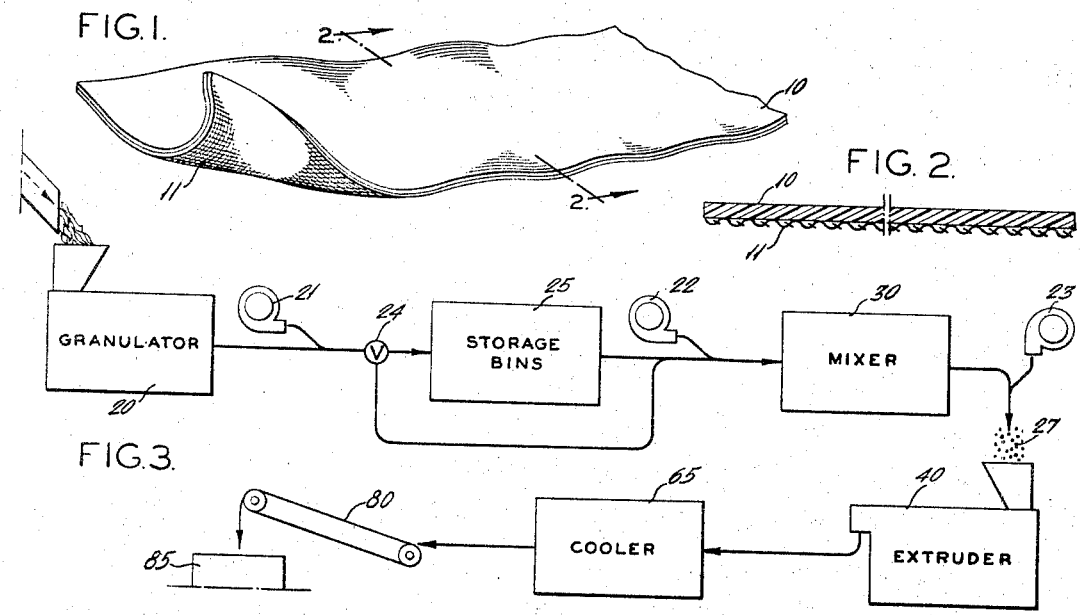
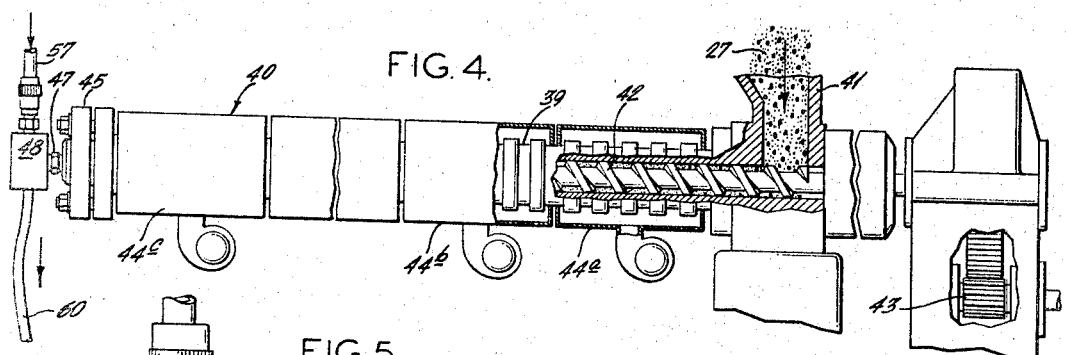
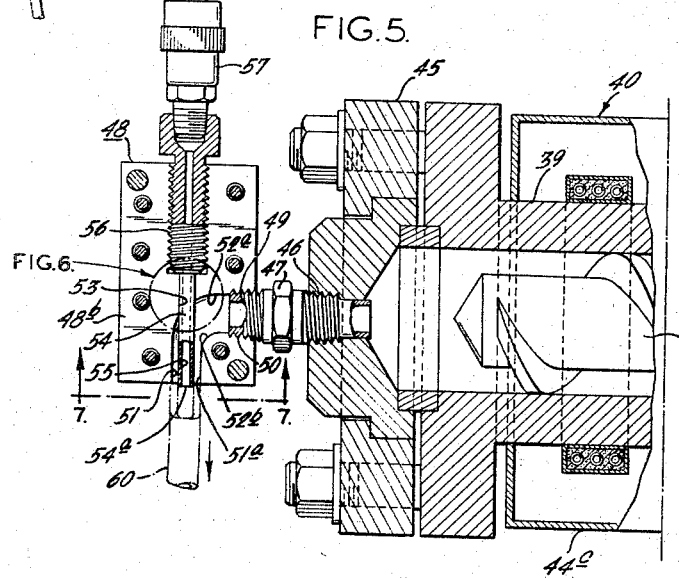
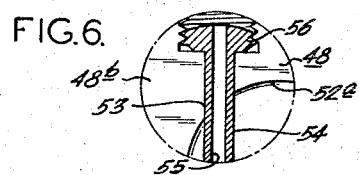
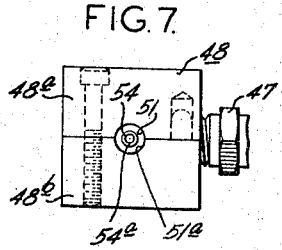

INVENTOR:
JAMES LOGRIPPO
BY Howson & Howson
ATTYS.

United States Patent Office 3,421,405
Patented Jan. 14, 1969

3,421,405
BRAIDED RUG EMPLOYING THERMOPLASTIC TUBING
James Logrippo, Norristown, Pa., assignor to Norristown Rug Manufacturing Company, Norristown, Pa., a partnership of Pennsylvania
Filed Oct. 14, 1964, Ser. No. 403,781
U.S. Cl. 87—6
Int. Cl. D04c 1/04
2 Claims The present invention relates to a method and apparatus for forming a novel extruded tube of thermoplastic waste material, and more particularly to a method and apparatus for forming a tube of waste thermoplastic having elastomeric properties, including the product formed thereby.

Large quantities of thermoplastic materials, exhibiting elastomeric properties are widely used today in various thicknesses and colors for a vast number of consumer products ranging from upholstery to inner linings and the like for wearing apparel. When used in these applications, the thermoplastic is usually accompanied by a knitted or woven cotton fabric which helps to support and give body to the thermoplastic. When cut for use, there are great quantities of this material, such as the selvage of large rolls, which are cast aside as being apparently useless or incapable of any processing which would permit reduction of the thermoplastic to its original state or to some other useful state. This application deals with a method and apparatus to utilize these great quantities of waste in forming a novel extruded tube or the like.

In view of the above, it is an object of the present invention to provide a method of forming a tubular end product having elastomeric properties and comprising primary constituents of thermoplastic waste material.

Another object of the present invention is to provide an extruded tube of thermoplastic waste material containing a substantial quantity of short lengths of fiber.

Another object of the present invention is to provide a method for forming an extruded tube to be used as a filler for oval or braided rugs which will give a rug of increased softness to the consumer.

Still another object of the present invention is to provide an extruded tube to be used as a filler for oval or braided rugs which will give a rug of increased softness to the consumer.

Another object of the present invention is to provide a novel die for forming a tube of thermoplastic material.

Another object of the present invention is to provide a novel extruded tube comprising waste thermoplastic resins having primary constituents of a plasticizer to give elastomeric end properties while having quantities of a blowing agent and staple fibers therein.

Other objects and a fuller understanding of the invention may be had by referring to the following description and claims taken in conjunction with the accompanying drawings in which:

FIG. 1 is a fragmentary perspective view of a typical piece of fabric supported thermoplastic waste material utilized in forming a tube in accordance with the present invention;

FIG. 2 is an enlarged sectional view taken along line 2—2 of FIG. 1;

FIG. 3 is a schematic block diagram of apparatus used to form an extruded tube in accordance with the present invention;

FIG. 4 is an enlarged fragmentary sectional view of a portion of the apparatus illustrated in FIG. 3 and illustrating certain apparatus utilized in accordance with the method of the present invention to form an extruded tube of thermoplastic exhibiting elastomeric properties;

FIG. 5 is a fragmentary enlarged view of a portion of the apparatus illustrated in FIG. 4;

FIG. 6 is an enlarged view of the dotted portion of the apparatus shown in FIG. 5 and labelled FIG. 6;

FIG. 7 is a bottom view of certain of the apparatus shown in FIG. 5 as viewed along line 7—7 of FIG. 5;

Figure 9:
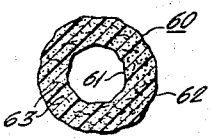
FIG. 9 is a sectional view taken along line 9—9 of FIG. 8.

Referring now to the drawings, and especially FIGS. 1 and 2 thereof, a typical piece of waste thermoplastic material 10 having, in the present instance, a fabric backing 11, is illustrated therein. Although the waste thermoplastic 10 illustrated in FIGS. 1 and 2 is shown with a fabric backing 11, it should be noted that any waste thermoplastic with or without the fabric backing may be utilized in accordance with the method and apparatus of the present invention to form a novel thermoplastic tube exhibiting elastomeric properties.

A typical example of waste thermoplastic exhibiting elastomeric properties which may be used to extrude a tube in accordance with the invention and as hereinafter set forth, is given below. It should be realized, however, that the chemical constituents of the example given may vary from batch to batch and may vary in the batch itself. However, bearing in mind that it is the result to be obtained that is important, i.e., that the tube be resilient and yet tough, the choice of waste material may preferably include compounds such as thermoplastic resins which have been treated with a compatible plasticizer. Further, the waste may preferably contain a blowing or foaming agent such that at least some of the waste has been foamed. A typical example of waste utilized is polyvinyl chloride sheet or tube having a plasticizer of the family of phthalate diesters and containing a nitrous or nitrogen foaming agent. As illustrated in FIG. 1, the sheet may also have a fabric backing such as a cotton knit which comprises 20% to 30% by weight of the associated waste.

In accordance with the method of the present invention, assuming that at last some of the waste to be used contains a fibrous material such as the backing 11 while other portions of the waste are of a different type and do not have a backing, or are of varying thicknesses etc.; thus the waste is first loaded into a granulator 20 which serves to chop the waste material into very small pieces, approximately 1/16 to 1/4 of an inch on a side. The ground up or granulated material is then conveyed by conveying means, in the present instance an air conveyor or blower 21, to either a storage bin 25 for subsequent use, or routed by a blower 22 via a flow valve 24 directly to a mixer 30 wherein the material is thoroughly mixed. It should be noted at the outset that the mixer and storage bins may of course be interchanged so that the granulated material is mixed before storage. Further, if the waste material is of only one type, the mixing stage may be bypassed entirely. From the mixer 30, the material is conveyed by a blower 23 to an extruder 40 wherein the material is initially heated to its flow temperature and then extruded. The material leaves the extruder, in the present instance, in the form of a tube 60. At this point the tube is at an elevated temperature. After the tube leaves the extruder it immediately sets in a cooler 65. Thereafter, the cooled and extruded tube 60 moves onto a conveyor 80 which moves the finished tube in continuous lengths to supply boxes 85 or spools or the like.

The extruder 40, utilized in producing a tube 60 from the mixed and granulated material, is illustrated in FIG. 4 and preferably has a non-vented casing 39, the purpose of which will hereinafter become evident. In the present instance, the extruder comprises a feed hopper 41 which feeds the granulated material 27 into a feed screw 42 for moving the material longitudinally of the extruder 40. As in the Prodex "hydraulic" extruder, the feed screw 42 connects at one end to drive means 43 which imparts rotative movement to the feed screw 42. Spaced longitudinally of the extruder are heater sections such as those designated 44a, 44b and 44c which heat the granulated and mixed material 27 so that it reaches its fluidized temperature.

In practice, it has been found desirable to heat the granulated and mixed thermoplastic waste to a temperature between 400° and 430°, preferably 410°, in the first stage heater 44a. It was discovered that by utilizing temperatures in the afore-mentioned range, the thermoplastic material, as it is melted, releases the foaming or blowing agent entrained within the waste thereby causing bubbles to form in the material as it is being conveyed by the feed screw 42. Thus, it is advantageous and desirable to extrude the waste product in a non-vented extruder so as to entrain the gaseous foaming or blowing agent within the material.

At the terminal end of the extruder is a hinged swing gate 45 which is designed to seal at high pressures and support relatively heavy dies. The hinged swing gate 45 has means defining an aperture 46 which connects the interior of the extruder via a threaded nipple 47 to a novel die 48, which in the present instance is split into identical halves 48a and 48b for ease of separation and removal from the extruder.

In accordance with one feature of the invention, the die 48 is provided with means to prevent tube collapse upon discharge from the die and at the same time is provided with means to form a tubular extrudate of waste thermoplastic material. To this end the die 48 comprises an inlet or connecting portion 49, in the present instance threaded, to receive the end 50 of the nipple 47. Extending from the inlet 49 is wall means defining a groove 51, having the same circumferential shape or outline as the exterior of the tube extruded therefrom, and terminating in an outlet 51a. In the present instance, the groove 51 has arcuate wall portions 52a and 52b, the outer portion 42a containing an aperture or orifice 53 for receipt therein of a mandrel 54 having a cross section of a shape homologous with the inner wall of the tube 60. The mandrel, projecting into the groove 51, is substantially coextensive with the groove and has a terminus 54a approximately at the outlet 51a of the grove. Further, the mandrel 54 has a hollow interior 55 which, through a coupling means, in the present instance a threaded nipple 56, is connected to an air coupling 57 extending therefrom. The air coupling 57 is connected to air supply means (not shown) for providing a small air pressure to the interior of the mandrel, It was discovered that approximately 5 to 10 ounces per square inch was sufficient pressure to prevent collapse of the extruded tube 60 upon leaving the groove 51.

In accordance with another feature of the die, the fit between the mandrel 54 at its place of entry into the groove 51 is made extremely tight in order that, in case of jamming of the grove 51 due to a buildup of lengths of fiber, or quantities of foreign material, it is a simple matter to turn the nipple 56 out of the die 48 thereby cleaning the mandrel. Thus, the edges of the orifices 53, at the point of entry, are sharp so that the mandrel 54 will be wiped clean of any accumulated and packed fibers which thereafter may be pushed out upon continuation of the extruding process. It should also be recognized that the above-described cleaning of the mandrel 54, should any accumulations occur, may be effected during the normal operation of the extruder and without shutting off the extruder.

Figure 8:
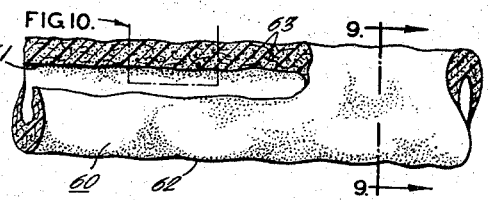
FIG. 8 is an enlarged fragmentary perspective view with a portion removed to better illustrate the interior of an extruded tube made in accordance with the present invention.
Figure 10:
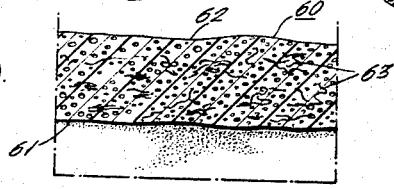
FIG. 10 is an enlarged view of the portion of the tube illustrated in FIG. 10 within dashed lines.

Referring now to FIG. 8, an enlarged fragmentary sectional view of a portion of the tube 60 is illustrated therein with portions broken away to better illustrate the interior thereof. As noted in FIG. 9, the tube 60 has inner and outer surfaces 61 and 62 respectively, which interior and exterior surfaces are illustrated as having irregularities (greatly exaggerated) in their outer contour. The irregularities in the wall structure are caused by extremely short lengths of fibers 63 suspended or entrapped and intermeshed throughout the tube, as well as bubbles, pockets or cells which are due, as previously explained, to the release of the foaming or blowing agent in the heating stages of the extruder 40. It should be noted that the random orientation of the fibers helps create, in part, a fibrous lattice network which aids in the formation of a tough, yet resilient tube.

Figure 12:
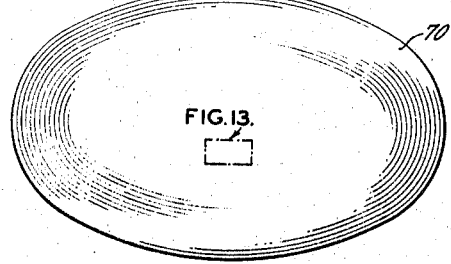
FIG. 12 is a schematic plan view of a rug embodying the braids illustrated in FIG. 11.

Because of themoplastic's inherent quality of non-deterioration and because of the selection of waste material containing chemicals as heretofore described in order to obtain an end product exhibited elastomeric properties, the thermoplastic tube lends itself to use as a filler for braided or the like rugs. Such a rug 70 is illustrated in FIG. 12, in the present instance the rug comprises a spiral wound "figure eight" braid, the adjacent portions of which are stitched to form a braided rug.

Of course, although the description of the rug 70 as set forth hereinafter utilizes a figure eight braid, a single braid having a filler 60 such as heretofore described is equally applicable in forming braided rugs.

Figure 11:
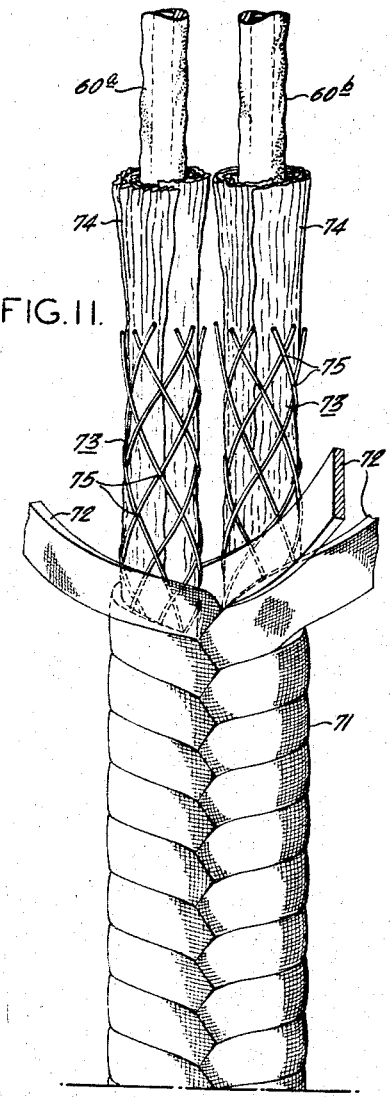
FIG. 11 is an enlarged fragmentary perspective view of a novel tube being used as a filler for braids of a braided rug.
Figure 13:
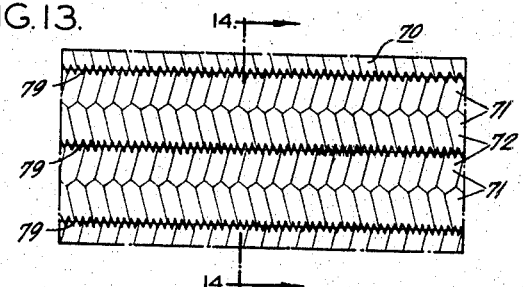
FIG. 13 is a fragmentary enlarged plan view of a portion of the rug illustrated in FIG. 12 and designated in FIG. 12 as FIG. 13.
Figure 14:
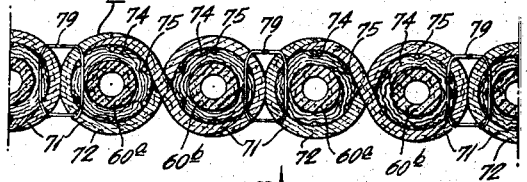
FIG. 14 is a fragmentary enlarged sectional view taken along line 14—14 of FIG. 14.

Referring now to FIG. 11, a figure eight braid 71 having an outer decorative portion comprising fabric strips 72 and a composite filler 73 is illustrated therein. It should be recognized that the outer braid, although in the present instance comprising strips, may be composed of any conventional and well known material such as knitted cord, yarn, etc. The composite filler comprises extruded tubes 60a and 60b manufactured in accordance with the method of the present invention and as heretofore described. In the present instance the filler includes a cellulose sheet 74 secured to the filler tubes 60a and 60b by twine or the like 75. The composite filler may be formed in a conventional manner on a typical 4, 8, 16, or commonly called tubular or round braiding machine or other machines using wrap around techniques, and thereafter the braid itself is formed on a braiding machine such as the five-strand braiding machine illustrated in FIG. 15.

Figure 15:
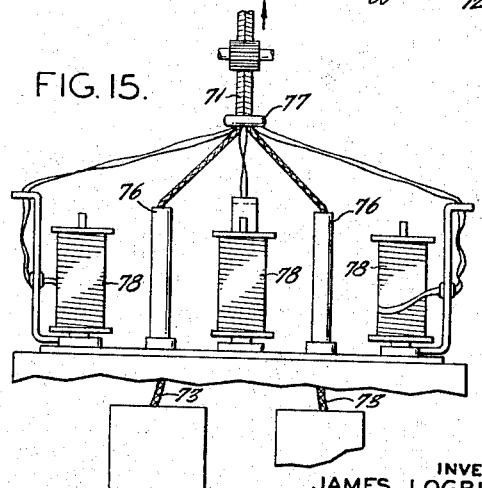
FIG. 15 is a schematic side profile of a typical braiding machine used to form the braids such as illustrated in FIG. 11.

As shown in FIG. 15, the composite filler 73 is fed through filler guide means 76 to a braiding guide 77 while a plurality of bobbins 78 travel in a figure eight path thus forming a braid such as the one illustrated in FIG. 11. Thereafter, in a manner well known in the art, the continuous length braids 71 are stitched together in a progressive manner, as at 79, thus forming a finished rug 70.

Rugs constructed in accordance with the foregoing and having a filler of thermoplastic tubing extruded in a manner as heretofore described, are extremely durable in construction and when in use, on the floor, give a resilient or "walking on air" impression. It should also be noted, however, that the filler as heretofore described, need only contain the thermoplastic tubing which may be of any diameter and have any wall thickness. The cellulose 74 in the illustrated instance is used only to make up a larger diameter bulk filler for the braids.

Although the use to which waste thermoplastic tubing has been put is novel and new, many other uses for such tubing may be desired. For example, larger diameter tubes may be manufactured using the method of the present invention and used for inexpensive pipe covering or insulation. Thus a length of tubing may be split longitudinally and placed over the pipe and then, if desired, a longitudinal strip of tape could be used to seal the tube. Further, small diameter tubing in short lengths could be used as spaghetti for multiconductor interconnections between electronics equipment or the like. Additionally, the tubing may be used for sealing around doors or the like or may have decorative application if a dye is added to the extruder.

In summary, an extruded tube is provided containing substantial amounts of fiber and which utilizes waste thermoplastic while providing a new and useful product. Further, a novel method of extruding such a tube has been defined utilizing a novel extruder head. Also, when using the tube as a filler for a braided rug or the like, a new and novel item of manufacture is provided.

Although the invention has been described with a certain degree of particularity, it is understood that the present disclosure has been made only by way of example and that numerous changes in the details of construction, method of operation, and the combination and arrangement of parts may be made without departing from the spirit and the scope of the invention as hereinafter claimed.

What is claimed is:

1. A braided rug comprising at least one length of spiral wound braid, said braid comprising a tubular filler portion and an outer decorative portion covering said filler, said filler comprising a thermoplastic waste material, at least some of said waste material exhibiting elastomeric properties and having randomly suspended and dispersed therein short lengths of fiber, said thermoplastic waste material containing a foaming agent causing the walls of said filler to contain bubbles.

2. A braided rug in accordance with claim 1 including a sheet of material wrapped about said tubular filler portion, said material intermediate said tubular filler and said decorative portion.

References Cited

UNITED STATES PATENTS

| | | | |
|---|---|---|---|
| 868,136 | 10/1907 | Shields | 161—178 X |
| 1,923,551 | 8/1933 | Murphy | 161—35 |
| 2,111,639 | 3/1938 | Petersen | 87—6 |
| 2,339,950 | 1/1944 | Sackner | 87—6 |
| 2,880,493 | 4/1959 | Mitchell | 87—6 X |
| 2,977,839 | 4/1961 | Koch | 87—6 X |
| 3,062,241 | 11/1962 | Brumbach | 138—125 |
| 3,098,281 | 7/1963 | Flitterman | 161—35 |
| 3,153,366 | 10/1964 | Iwai | 87—7 |
| 3,234,309 | 2/1966 | Graff | 264—95 |
| 2,602,766 | 7/1952 | Francis | 87—6 |
| 2,849,028 | 8/1958 | Clark et al. | 138—118 |
| 2,979,982 | 4/1961 | Weitzel | 87—6 |
| 2,991,808 | 7/1961 | Siegmann et al. | 138—125 XR |
| 3,018,800 | 1/1962 | Hanssens | 138—125 |
| 3,071,162 | 1/1963 | Mick | 138—118 XR |
| 3,115,164 | 12/1963 | Vanderbilt | 138—125 |
| 3,129,631 | 4/1964 | Hill et al. | 87—6 |
| 3,183,941 | 5/1965 | Woodell | 138—177 XR |
| 3,289,703 | 12/1966 | Brown | 138—125 |
| 3,290,426 | 12/1966 | Barrentine | 138—177 XR |

FOREIGN PATENTS 1,288,922  2/1962  France.

JOHN PETRAKES, *Primary Examiner.*

U.S. Cl. X.R.

87—7; 57—144; 161—35; 264—95; 138—123, 174